: US005178706A

United States Patent [19]

Nishibara et al.

[11] Patent Number: 5,178,706
[45] Date of Patent: Jan. 12, 1993

[54] METHOD OF PRODUCING THIN FIBER-REINFORCED RESIN SHEET

[75] Inventors: Hajime Nishibara; Akira Morii; Mikio Hayashi; Taro Mihara; Muneharu Wada; Yasushi Chosokabe, all of Niihama, Japan

[73] Assignee: Sumitomo Chemical Co., Ltd., Osaka, Japan

[21] Appl. No.: 750,237

[22] Filed: Aug. 20, 1991

Related U.S. Application Data

[63] Continuation of Ser. No. 357,652, May 25, 1989, abandoned, which is a continuation of Ser. No. 136,631, Dec. 22, 1987, abandoned.

[30] Foreign Application Priority Data

Jan. 23, 1987 [JP] Japan .................................. 62-14629

[51] Int. Cl.$^5$ .............................................. B29C 55/02
[52] U.S. Cl. .................................... 156/229; 156/163; 264/108; 264/289.3
[58] Field of Search ............... 156/229, 163, 160, 181, 156/296, 161, 164, 178; 264/290.2, 108, 288.4, 289.3

[56] References Cited

U.S. PATENT DOCUMENTS

| | | | |
|---|---|---|---|
| 1,929,839 | 10/1933 | Dawson | 156/495 |
| 2,259,347 | 10/1941 | Mallory | 156/164 |
| 2,259,362 | 10/1941 | Young | 156/164 |
| 2,429,177 | 10/1947 | Young | 156/164 |
| 2,594,229 | 4/1952 | Snyder et al. | 156/229 X |
| 3,446,686 | 5/1969 | Butler | 156/229 |
| 3,513,067 | 5/1970 | Tangorra | 264/288.4 X |
| 3,578,544 | 5/1971 | Thorsrud | 264/108 X |
| 3,864,184 | 2/1975 | Crandall et al. | 156/229 |
| 3,930,098 | 12/1975 | Araki et al. | 264/290.2 X |
| 4,076,785 | 2/1978 | Schmidt | 264/DIG. 73 X |
| 4,141,929 | 2/1979 | Stoops et al. | 264/160 X |
| 4,302,408 | 11/1981 | Ichihara | 156/229 |
| 4,489,123 | 12/1984 | Schijve et al. | 156/229 |
| 4,501,631 | 2/1985 | Bestian, Jr. et al. | 156/229 |
| 4,532,099 | 7/1985 | Kaji | 264/510 |

FOREIGN PATENT DOCUMENTS 2282985 3/1976 France .

*Primary Examiner*—Michael W. Ball
*Assistant Examiner*—Francis J. Lorin
*Attorney, Agent, or Firm*—Wenderoth, Lind & Ponack

[57] ABSTRACT

The thickness of a fiber-reinforced resin sheet having uniformly distributed and substantially unidirectional fibers is reduced by stretching a fiber-reinforced resin sheet starting material in intimate contact with a thermoplastic sheet having a tensile strength larger than the fiber-reinforced resin sheet. This is accomplished by heating the fiber-reinforced resin sheet at a temperature at which the resin in the fiber-reinforced resin becomes sticky and subjecting the sheets to a uniform compressive force to adhere the fiber-reinforced sheet to the thermoplastic resin sheet and then simultaneously stretching the thus-adhered sheets to form a thin fiber-reinforced sheet in which the direction of stretching is perpendicular to the direction of the fibers.

2 Claims, No Drawings

METHOD OF PRODUCING THIN FIBER-REINFORCED RESIN SHEET

This application is a continuation of now abandoned application Ser. No. 07/357,652 filed on May 25, 1989, which in turn is a continuation of application Ser. No. 07/136,631, filed Dec. 22, 1987, both applications now abandoned.

The present invention relates to a method of producing a thin fiber-reinforced resin sheet.

More particularly, the invention relates to a method of producing a thin product by further processing a fiber-reinforced resin sheet produced in an ordinary method.

Synthetic resin sheets or rubber sheets reinforced with carbon fiber, glass fiber, alumina fiber, aromatic polyamide fiber, etc. include prepreg sheets of continuous fiber bundle sheets impregnated with a thermosetting resin, and sheet molding compounds in which chopped strands are used. They are widely utilized for sports or leisure use such as fishing rods, golf shafts, etc., industrial materials, molding materials for airplanes and cars, etc.

Accompanied with the disversification of their use, fiber-reinforced resin sheets having various thicknesses are being developed.

To give an example for prepreg sheets, their fiber content is generally 50–300 g/m$^2$, but recently thin prepreg sheets less than 50 g/m$^2$ have been developed.

Existence of thin prepreg sheets is shown in Japanese Patent Kokai (Laid-open) No. 165428/1982 and in Japanese Patent Kokai (Laid-open) No. 74347/1983.

Methods of producing ordinary prepreg sheets are shown from old in a large number in the literature including SEN-I GAKKAISHI, vol. Aug. 34, 1978., in which carbon fiber is used as an example.

Japanese Patent Kokai (Laid-open) No. 11315/1985 discloses a method of producing thin prepreg sheets.

The regulation of the thickness of these sheets is made by an increase or decrease of the fiber weight per unit area, that is, the number of filaments per fiber bundle is increased or decreased, or by changing the thickness of the fiber itself.

In the case of a carbon fiber prepreg sheet for example, when producing a very thin prepreg sheet whose fiber content is 10–20 g/m$^2$, a fiber bundle is used which is composed of 1,000–2,000 filaments, and the weight per unit length of which is 0.06–0.15 g/m.

In general, the fewer the number of filaments of a fiber bundle, the more expensive is the fiber bundle. Moreover, the finer the monofilaments, the more expensive are the monofilaments, and such monofilaments are susceptible to breakage and are liable to be entangled with each other. This makes the handling difficult, so that a prepreg sheet produced from such monofilaments is expensive and furthermore, in such fiber arrangement the fibers are not linear or straight.

When a thin prepreg sheet is produced from a fiber bundle composed of many thick monofilaments, the fiber bundles are spread out several times more than in the case where the fiber bundles are spread out to produce a prepreg of ordinary thickness.

However, a thin prepreg sheet produced by such a method has many spaces between fibers, and consequently tends to form a nonuniform sheet in which the fibers are not unidirectional because of these spaces which vary in width.

The object of the present invention is to remedy the above-mentioned faults and to provide a method of producing thin fiber-reinforced resin sheets having uniform mechanical and physical properties.

The present invention is a method of producing thin fiber-reinforced resin sheets which comprises stretching a fiber-reinforced resin sheet together with a thermoplastic resin sheet.

The fiber-reinforced resin sheets used as a starting material in the present invention are those which are well known and widely used.

These include, for example, prepreg sheets composed of continuous fibers arranged unidirectionally, sheets of chopped strand fibers treated with a sheet molding compound (hereinafter referred to as SMC sheets), and resin sheets blended with whiskers.

Among those prepreg sheets described above, those comprised of unidirectionally arranged continuous fibers exhibit the characteristics desired, such as the production of thin and uniform prepreg sheets having good mechanical properties.

These fiber-reinforced resin sheets used as a starting material may be any produced by a known method, and are not specified. These starting material fiber-reinforced resin sheets have their both sides stuck with release paper or plastic film. The fibers used for the starting material fiber-reinforced resin sheets correspond to fibers used for ordinary fiber-reinforced resin.

Examples of such fibers include inorganic fibers such as glass fibers, carbon fibers, graphite fibers, and ceramic fibers such as aluminous fibers, boron fibers, titania fibers, silicon carbide fibers; organic fibers such as natural fibers, and synthetic fibers such as cellulosic fibers, aromatic polyamide fibers, polyester fibers, polyamide fibers, acrylic fibers, polyethylene fibers, polypropylene fibers; metal fibers such as stainless steel fibers, metal-coated inorganic fibers and organic fibers; ceramic-coated metal fibers, etc.

These fibers are used alone or in combination of two or more kinds depending on the particular required properties.

These starting material fibers may be used just as they are sold on the market.

The synthetic resins and rubbers used as matrices for the starting material fiber-reinforced resin sheets correspond to those well known used for fiber-reinforced resins.

These include resins which are essentially thermosetting resins but have thermoplastic properties before curing, such as epoxy resin, phenol resin, alkyd resin, urea-formaldehyde resin, melamine-formaldehyde resin, unsaturated polyester resin, aromatic polyamide resin, polyamide-imide resin, polyester-imide resin, polyimide resin, polybenzothiazole resin, silicon resin, etc.; thermoplastic resins such as polyethylene, polypropylene, polymethylmethacrylate, polystyrene (including high impact polystyrene), polyvinyl chloride, ABS resin, styrene-acrylonitrile copolymer, polyamide, polyacetal, polysulfone, polycarbonate, polyphenylene oxide, polyethersulfone, polyether ether ketone, etc.; synthetic rubbers such as polybutadiene, polyisoprene, polychloroprene, styrene-butadiene copolymer (SBR), acrylonitrile-butadiene copolymer (NBR), silicone rubber, and natural rubber, and resin compositions of mixture of these.

Among these resins, epoxy resins, unsaturated polyester resins, polysulfone, polyethersulfones, polyether ether ketones, and polyimides are generally used.

The thermoplastic resin sheets which are to be stretched together with the starting material fiber-reinforced resin sheets used in the present invention may be any that can be stretched more than 1.5 times in the stretching direction.

For example, sheets of high density polyethylene, low density polyethylene, polypropylene, polyethylene terephthalate, polystyrene, polyvinyl chloride, polyvinyl alcohol, polyamide, polyethersulfone, polyether ether ketone, etc. correspond to these.

The kind of the thermoplastic resin sheet and the thickness of the sheet should be so selected that the tensile strength of the thermoplastic resin sheet is larger than the tensile strength of the starting material fiber-reinforced resin sheet in the stretch processing conditions, i.e., stretch direction, stretch times, and stretch temperature.

Of course, it is necessary that the resin of the fiber-reinforced resin sheet should have a close adhesion to the thermoplastic resin sheet.

In the case of an epoxy resin-impregnated and unidirectionally arranged prepreg sheet, the thickness of a high density polyethylene sheet is of the order of 50–300 $\mu$.

This thermoplastic resin sheet is used in intimate contact with one side or both sides of the fiber-reinforced resin sheet.

The tensile strength, when the thermoplastic resin sheet is used on both sides of the fiber-reinforced resin sheet, is the sum on both sides, as a matter of course.

When one side is used, the other side may be stuck to a very thin and easily stretchable thermoplastic resin film if necessary, for the purpose of prevention of sticking and surface protection.

In order to bring the thermoplastic resin sheet or film into intimate contact with the surface of the starting material fiber-reinforced resin sheet, the release paper or plastic film stuck to the surface of the starting material fiber-reinforced resin sheet is first peeled off and then the thermoplastic film is stacked on to the surface of the starting material fiber-reinforced resin sheet. It is favorable that the time between peeling off and sticking is short. Caution should be exercised so that air does not become trapped between the stuck surfaces.

Subsequently, these stacked or superposed sheets are heated to a temperature at which the matrix resin of the starting material fiber-reinforced resin sheet can exhibit its stickiness and then a uniform compressive force is applied to the sheets.

In a particular case, the sheets may be caused to pass between rollers heated to a prescribed temperature.

The heating at this time may also serve as the preheating for the subsequent stretching step.

When making a large size thin sheet from a plurality of starting material fiber-reinforced resin sheets, gaps or spaces between the sheets may be generated after stretching, if the ends of the said sheets are only in contact with each other. In this connection, when two prepreg sheets are joined, the adjacent end portions are partly overlapped with each other and the thermoplastic film is adhered to the overlapped portion as well as the non-overlapped portion. In order to prevent the generation of such gaps or spaces, the end parts are placed one upon another slightly to an extent of 0.5–5.0 mm.

In respect to the stretching direction of a prepreg sheet made of a starting material fiber-reinforced resin sheet in which continuous fibers are arranged unidirectionally, there are often cases where the continuous fibers themselves are unstretchable or difficult to stretch. Therefore, stretching is generally carried out under tension in a crosswise direction, that is, at right angles to the direction of the continuous fibers, or in a direction in which the vector (at right angles to the fiber direction) can be divided into directions at right angles.

In the case of a SMC sheet or a resin sheet blended with whiskers, the stretching may be effected in various and multiple directions crosswise.

When the stretching of the SMC sheet or resin sheet blended with whiskers is conducted in one direction only, the fibers contained inside becomes arranged in the direction of the stretching so that the mechanical strength of the sheet can be made to have directionality. Such a sheet is suitable for specific uses. Furthermore, when the matrix resin is a thermoplastic resin, molecular orientation of the resin is caused, so that the strength per thickness of the fiber-reinforced resin sheet can be increased.

As regards the methods of stretching, it is possible to apply methods of producing monoaxially or biaxially stretched films from thermoplastic resin films.

That is to say, such methods include roll stretch method wherein while the sheet is made to pass between a plurality of rolls successively, the diameter and number of rotation of the rolls are changed, whereby the sheet is stretched under tension; and tenter stretch methods which comprise a method wherein both ends of the sheet is successively grasped and held by clip chains, by which tension is applied laterally to stretch it; and a method wherein said clip chains are moved successively on gradually spreading guide rails, by which tension is applied laterally or laterally and longitudinally at the same time to stretch it.

The roll stretch method performs stretching in the longitudinal direction only. Therefore, the method can be continuously combined with the process of sticking the above-mentioned thermoplastic resin sheet as an extension of the production of the starting material fiber-reinforced resin sheet itself, or the method can be used by continuously letting out the starting material fiber-reinforced resin sheet from its roll.

In the case of a prepreg sheet composed of a starting material fiber-reinforced resin sheet in which continuous fibers are arranged in order unidirectionally, the sheet is cut into pieces of a prescribed length less than the width of the roll. Then the cut pieces of sheet are turned and arranged crosswise and are stretched in the direction at right angles viewed from the direction of the fibers or in a direction in which the vector can be divided into directions at right angles.

In the case of stretching another starting material fiber-reinforced resin sheet in both lengthwise and crosswise directions by the roll stretch method, first the sheet is stretched in the lengthwise direction, and subsequently it is cut into pieces of a prescribed length as described above. Then the cut pieces are turned and arranged crosswise and stretched.

As the apparatus used in the roll stretch method, it is possible to apply a well-known apparatus for producing monoaxially stretched films as mentioned above.

The structure of the apparatus consists of a raw sheet fixing table followed by a combination part of rolls and a winding part.

The combination part of rolls consists of a preheating part, stretch part, annealing part, and cooling part.

Each roll is set at a temperature suitable for the resin of each sheet. The annealing part is used where necessary depending on the kind of the matrix resin.

In the stretch part, external heating may be conducted by a hot air current or an electric heater.

The temperature at the stretch part is, a temperature which allows the stretch of both sheets, i.e., a temperature at which the resin of the starting material fiber-reinforced resin sheet becomes sufficiently plastic and low in viscosity. For example, it equal to the resin temperature used in processing under heating to produce the starting material fiber-reinforced resin sheet or several ten degrees (°C.) lower than that temperature.

The regulation of the stretch ratio is made by changing the peripheral speed of the rolls in the stretch part.

The thickness of the sheet and the fiber content per unit area of the sheet are inversely proportional to the change of the area of the sheet, so that these can be regulated by the stretch ratio.

In the tenter system, stretch can be done either in crosswise direction, or in both crosswise and lengthwise directions, as mentioned previously.

The stretch ratio can be determined by the predetermined position of the clip chain guide rails.

The method of the present invention can be applied not only to fiber-reinforced resin sheets, but also for the production of thin resin sheets reinforced by fillers including natural products such as silica, alumina, amorphous, globular or hollow glass, mica, talc, etc.

By the method of the present invention, it is possible to easily produce, from the usual fiber-reinforced resin sheets, thinner sheets of various thicknesses, and particularly very thin sheets which have been difficult to produce by conventional methods.

In the case of prepreg sheets in which continuous fibers are arranged in order unidirectionally, it is possible to produce thin prepreg sheets of uniform fiber distribution and excellent fiber linearity even from fiber bundles composed of thick and multiple monofilaments per bundle.

When this thin prepreg sheet is used in combination with an ordinary prepreg sheet, in such a way that the former is placed on the latter so that the fiber direction of the former crosses the fiber direction of the latter at right angles with each other, this combined sheet is effective in increasing the crushing strength, flexural strength and compression strength of a cylindrical body such as fishing rod, golf club shaft, etc. formed from such a sheet, or when they are placed one on another so that they cross obliquely, this combined sheet is effective in increasing the twisting strength.

Furthermore, when the fiber-reinforced resin sheet is a SMC sheet or a sheet blended with whiskers, it is not only possible to easily produce a thinner sheet of various thicknesses or a very thin sheet, but also it is possible to produce a sheet for specific uses by arranging the internal reinforcing fibers unidirectionally so that the resulting sheet can have directionality in strength.

When the matrix resin of the fiber-reinforced resin sheet is a thermoplastic resin, it is possible to cause the sheet to have directionality in mechanical strength by molecular orientation, or it is possible to provide the sheet for specific processing by utilizing the heat shrinking properties upon the secondary processing step.

The present invention will be explained in further detail by way of Examples but the invention is not limited to these Examples.

In order to determine the criterion for the evaluation of the thin prepreg sheet in the Examples, the sheet was observed with an optical microscope; spaces between fibers were measured and its maximum value and the linearity of the fibers were examined.

A pipe was formed from a combination with an ordinary prepreg sheet and the formed pipe was observed with a scanning type electron microscope; and examination was made whether there is any voids in the cross-section and the area of the voids if any, and also whether there is any wrinkles.

As the stretching apparatus was used a monoaxial stretching apparatus consisting of a fixing table of raw sheets for stretching, six preheating rolls, five stretch rolls, an annealing roll, a cooling roll, and a winder.

EXAMPLE 1

In accordance with the conventional method as described in Sen-i Gakkaishi, vol. 24 August 1978, page 257, para. 2.1.1-(2)-(ii), the starting material fiber-reinforced resin sheet was prepared.

As the starting material fiber-reinforced resin sheet was used a fiber-reinforced resin sheet, whose fibers were Carbon Fiber AS4 (produced by Hercules Corp.; modulus of elasticity 24 ton/mm$^2$), and whose yarn was composed of 3,000 filaments/bundle. The sheet was impregnated with a matrix resin which was a mixed epoxy resin of bisphenol A type and cresol novolac type. The resulting sheet used was a prepreg sheet composed of unidirectionally arranged continuous fibers, whose resin content was 45 weight %, fiber weight per unit area was 80 g/m$^2$, and 1 m in width and 15 m in length.

The prepreg sheet was cut into pieces of a length of 1.1 m, and 13 cut pieces of the sheet were arranged in crosswise direction.

On both sides of the sheets, a high density polyethylene sheet for stretching use, 120$\mu$ thick, 1.25 m wide, and 20 m long, was stuck as the thermoplastic resin sheet, and the resulting sheet was caused to pass between heated rolls at 50° C. and was wound to obtain a roll of raw sheet for stretching use.

Then, the temperature of the preheating part of the monoaxial stretching apparatus was set at 100° C.; the stretch part, 125° C.; the annealing part, 125° C.; and the cooling part, 40° C. The raw sheet for stretching use was caused to travel from the raw sheet fixing table onto the rolls rotated at a speed of 3 m/min at the preheating part, and 24 m/min at the stretch part, and finally it was wound on the winder to obtain a thin prepreg sheet, 1.1 m wide and 100 m long, and having a fiber weight per unit area of 10 g/m$^2$. The results of evaluation are shown in Table 1.

Then, to form a pipe, a separately prepared prepreg sheet of continuous fibers arranged unidirectionally composed of Carbon Fiber IM6 (product of Hercules Corp.; modulus of elasticity 30 ton/mm$^2$) and mixed epoxy resin of bisphenol A type and cresol novolac type, whose fiber weight per unit area was 125 g/m$^2$ and resin content was 34 weight %, was stuck together with said thin prepreg sheet so that their fiber directions could cross at 90°. Thereafter, the resulting stuck sheet was wound four times on a metal rod of 10 mm in diameter so that the thin prepreg sheet could come inside.

After this roll was wound tightly with a shrinking tape of polypropylene, it was heated to cure in a hot air current oven at 100° C. for one hour, followed by heating at 120° C. for one hour, thus to obtain a pipe shaped body. The results of evaluation are shown in Table 1.

COMPARATIVE EXAMPLE 1

The process was conducted in the same way as the production of the starting material fiber-reinforced sheet used in Example 1 in Example 1 except that the fiber weight per unit area was 10 g/m$^2$. The results of evaluation are shown in Table 1.

EXAMPLE 2

A thin prepreg sheet was produced in the same way as in Example 1 using the same prepreg sheet of unidirectionally arranged continuous fibers except that the starting material fiber-reinforced resin sheet was composed of Carbon Fiber IM6 bundles containing 6000 fibers per bundle. The results of evaluation is shown in Table 1.

EXAMPLE 3

A thin prepreg sheet was produced in the same way as in Example 1 using the same prepreg sheet of unidirectionally arranged continuous fibers except that the starting material fiber-reinforced resin sheet was composed of bundles of alumina fibers (product of Sumitomo Chemical Company, Ltd.; diameter 9μ) containing 1,000 fibers/bundle, the fiber weight per unit area was 80 g/m$^2$, and the resin content was 30 weight %.

The results of evaluation is shown in Table 1.

TABLE 1

| | Thin prepreg sheet | | Pipe shaped body | |
|---|---|---|---|---|
| | Slit mm | Fiber linearity | Voids | Wrinkles |
| Example 1 | 0.3 | Good | No | No |
| Comparative Example 1 | 2 | Rather bad | Present (3%) | Present |
| Example 2 | 0.4 | Good | No | No |
| Example 3 | 0.3 | Good | No | No |

What we claim is:

1. A method for stretching a fiber-reinforced resin sheet as a starting material in intimate contact with a thermoplastic resin sheet which has a tensile strength larger than the tensile strength of the resin of the starting material fiber-reinforced resin sheet, which comprises heating the fiber-reinforced resin sheet at a temperature at which the resin in the fiber-reinforced resin becomes sticky and subjecting the sheets to a uniform compressive force to adhere the fiber-reinforced resin sheet to the thermoplastic resin sheet such that the fibers are uniformly distributed and are substantially unidirectional, and then stretching both the fiber-reinforced resin sheet and the thermoplastic resin sheet simultaneously, more than 1.5 times the original length of the thus-adhered fiber-reinforced resin sheet and thermoplastic resin sheet in the stretching direction, while they are adhered together to thereby form a thin fiber-reinforced resin sheet due to reduction in thickness by stretching wherein the direction of stretching is perpendicular to the direction of the reinforcing fibers of the fiber-reinforced resin sheet.

2. A method according to claim 1 in which the starting material fiber-reinforced sheet is a prepreg sheet in which continuous fibers are arranged unidirectionally therein.

* * * * *